United States Patent [19]

Fujii et al.

[11] 4,392,539

[45] Jul. 12, 1983

[54] INSTRUMENT PANEL WITH A YIELDABLE METER CASING

[75] Inventors: Takayuki Fujii, Saitama; Hitoshi Suda, Kamifukuoka, both of Japan

[73] Assignee: Honda Giken Kogyo Kabushiki Kaisha, Tokyo, Japan

[21] Appl. No.: 216,941

[22] Filed: Dec. 16, 1980

[30] Foreign Application Priority Data

Dec. 17, 1979 [JP] Japan .......................... 54-174450[U]

[51] Int. Cl.³ ............................................ B60R 21/04
[52] U.S. Cl. ..................................................... 180/90
[58] Field of Search ........................................... 180/90

[56] References Cited

U.S. PATENT DOCUMENTS 3,498,402  3/1970  Barenyi ................................ 180/90
3,820,621  6/1974  Breitschwerdt et al. ............. 180/90

Primary Examiner—Richard A. Bertsch
Attorney, Agent, or Firm—Irving M. Weiner; Pamela S. Burt; John L. Shortley

[57] ABSTRACT

An instrument panel for vehicles including a base and a trough-shaped meter casing fastened to the base by stays disposed in the meter casing. Each of the stays includes a pair of leg portions which are angularly inclined relative to a principal direction in which severe impacts are likely to occur against the meter casing. When the meter casing is subjected to impacts, the leg portions of the stays give way and buckle such that the meter casing is displaced or yields without being broken or damaged. The impacting force is thus absorbed, and a person in the vehicle who collides with the meter casing is protected from serious injury.

8 Claims, 7 Drawing Figures

_4,392,539_

INSTRUMENT PANEL WITH A YIELDABLE METER CASING

FIELD OF THE INVENTION

The present invention relates to an instrument panel for vehicles which includes a meter casing which is mounted so as to be yieldable or displaceable when subjected to impacts.

SUMMARY OF THE INVENTION

The present invention provides an instrument panel for vehicles which includes an instrument panel base having a meter casing mounted thereon. At least one stay is disposed in the meter casing, and the meter casing is fastened to the instrument panel base by the stay. The stay includes a pair of leg portions substantially angularly inclined relative to a principal direction of impacts against the meter casing so as to substantially buckle when the meter casing is subjected to impacting forces.

In accordance with the invention there is provided a trough-shaped meter casing mounted on an instrument panel base by stays having leg portions which are substantially angularly inclined relative to a principal direction in which severe impacts are likely to occur against the meter casing. The leg portions of the stays are adapted to buckle when impacts are applied to the meter casing, thus permitting the casing to yield or be displaced without being broken.

It is an object of the invention to provide an instrument panel having a meter casing which is mounted so as to be yieldable without being broken or damaged when subjected to impacts.

Another object of the present invention is to provide an instrument panel including a meter casing which is mounted so as to absorb impacts applied thereto, thereby protecting a person colliding therewith.

Still another object of the present invention is to provide an instrument panel with a meter casing yieldably mounted by stays having a simplified structure and constructed of a minimum number of parts.

The above and further objects, features and advantages of the present invention will become apparent from the following detailed description when read in conjunction with the accompanying drawings.

DETAILED DESCRIPTION OF PREFERRED EMBODIMENTS

Figure 1:
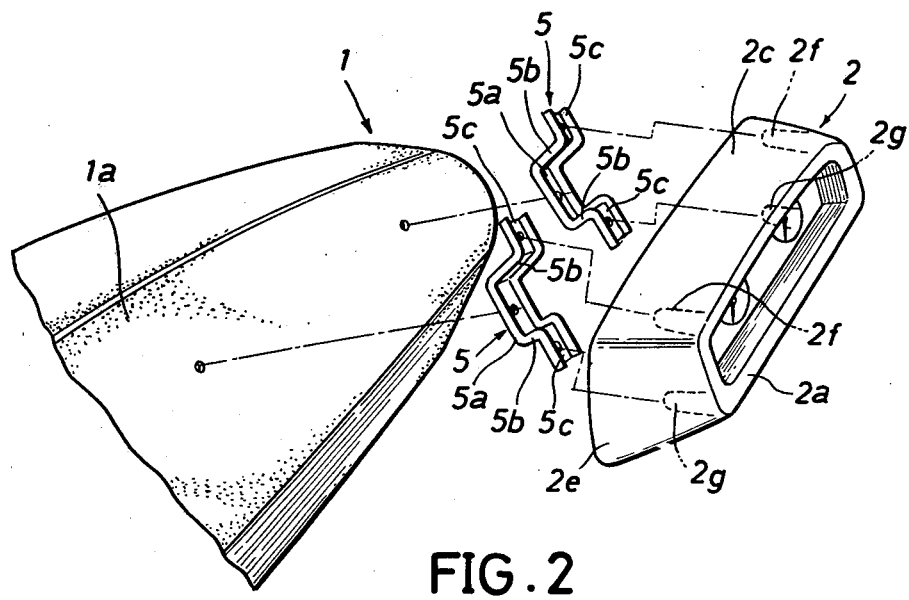
FIG. 1 is a perspective view of a disassembled instrument panel including a meter casing in accordance with a first embodiment of the present invention.
Figure 2:
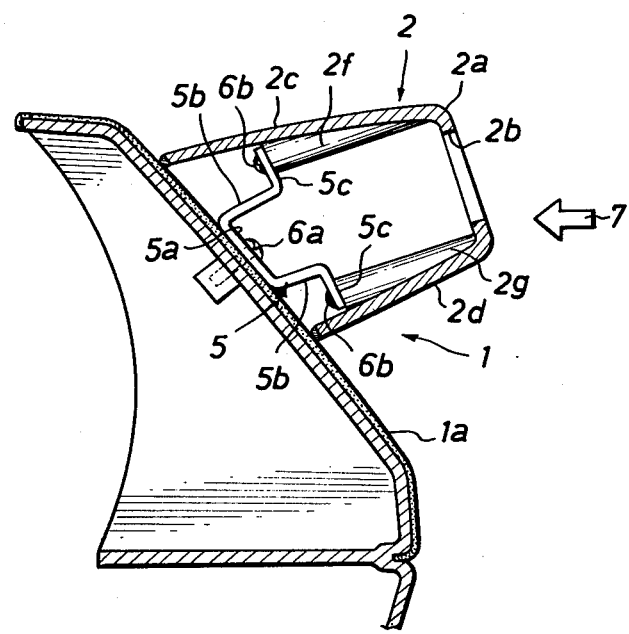
FIG. 2 is a vertical cross-sectional view of the instrument panel of FIG. 1 is assembled condition.
Figure 7:
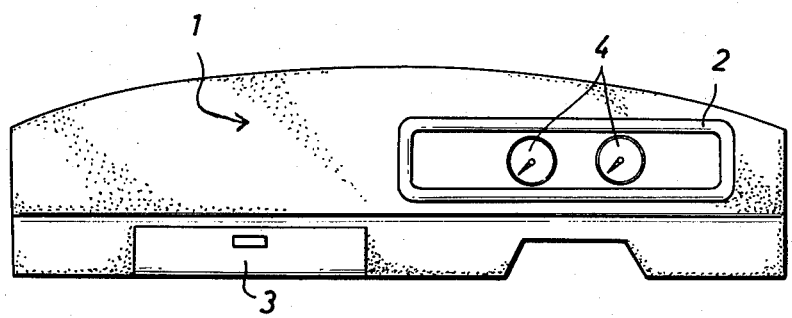
FIG. 7 is a schematic front elevational view of an instrument panel constructed in accordance with the present invention.

As shown in FIGS. 1 and 2, an instrument panel 1 in accordance with a first embodiment of the invention includes a base 1a mounted on a vehicle body (not shown) and a meter casing or housing 2 mounted on the base 1a and facing rearwardly in a vehicle compartment, the base 1a and the meter casing 2 being made of a synthetic resin material in a known manner. The meter casing 2 houses a variety of meters 4, 4 (FIG. 7) such as, for example, a speedometer, a tachometer, a fuel meter, a temperature gauge, etc. As shown in FIG. 7, the base 1a further supports a glove box 3.

The meter casing 2 is substantially trough-shaped as shown in FIGS. 1 and 2, and includes a front wall 2a having an opening 2b through which the meters can be observed. Meter casing 2 further includes a pair of spaced upper and lower walls 2c, 2d extending toward the base 1a, and a pair of spaced sidewalls 2e, 2e extending between the upper and lower walls 2c, 2d and extending toward the base 1a.

An upper pair of bosses 2f, 2f and a lower pair of bosses 2g, 2g are disposed on the upper and lower walls 2c, 2d, respectively, adjacent to the sidewalls 2e, 2e in the interior of meter casing 2, the bosses 2f, 2f, 2g, 2g being substantially parallel and extending toward the base 1a.

The bosses 2f, 2g are substantially shorter than the upper and lower walls 2c, 2d in the direction of extension toward panel base 1a, so as to define spaces between the distal ends of the bosses 2f, 2g and the panel base 1a, respectively.

The meter casing 2 is fastened to the panel base 1a by a pair of laterally spaced flanged stays 5, 5 having a channel-shaped cross section and disposed in the meter casing 2, each stay 5 including a central base portion 5a attached by a screw 6a to the panel base 1a. Each of the stays 5, 5 further includes a pair of leg portions 5b, 5b extending substantially transversely from the central base portion 5a and substantially parallel to each other, in a direction away from the panel base 1a. The stays 5, 5 are also provided with a pair of flanges 5c, 5c extending from the leg portions 5b, 5b, respectively, and directed away from each other. The flanges 5c, 5c of each stay 5 are attached by respective screws 6b, 6b to the distal ends of one of the upper bosses 2f and a corresponding one of the lower bosses 2g, respectively.

The leg portions 5b, 5b of the stays 5, 5 as mounted on the panel base 1a are substantially angularly inclined relative to a principal direction indicated by the arrow 7 (FIGS. 2 and 3) in which severe impacts against the meter casing 2 are likely to occur.

Figure 3:
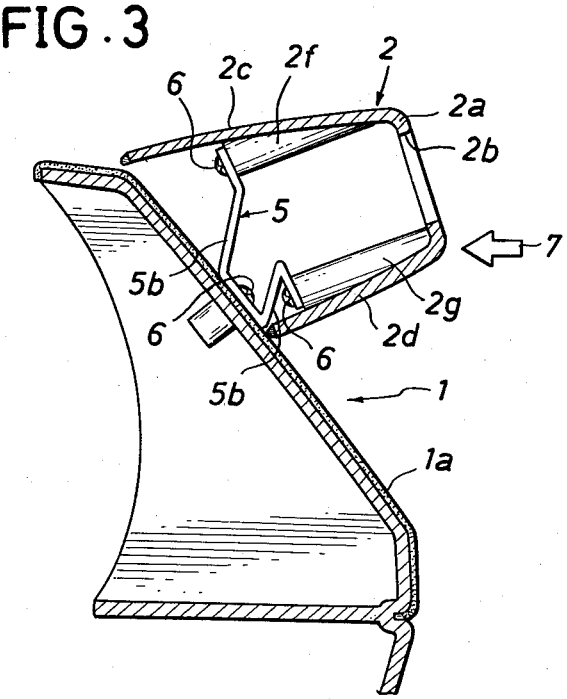
FIG. 3 is a view similar to FIG. 2, showing the manner in which the meter casing yields when subjected to an impact.

When the meter casing 2 is subjected to an impact in the direction of the arrow 7, such as by an occupant of the vehicle colliding therewith, the leg portions 5b, 5b of the stays 5, 5 buckle laterally with respect to the central base portions 5a and flanges 5c, as shown in FIG. 3, thus permitting the meter casing 2 to yield or be displaced along the surface of the panel base 1a, or upwardly and forwardly in the illustrated embodiment. Thus, the force of impact is damped and the meter casing 2 is prevented from being broken or damaged. Moreover, the yieldable meter casing 2 protects a person colliding with the meter casing 2 from serious injury by absorbing the kinetic energy from such person.

Figure 4:
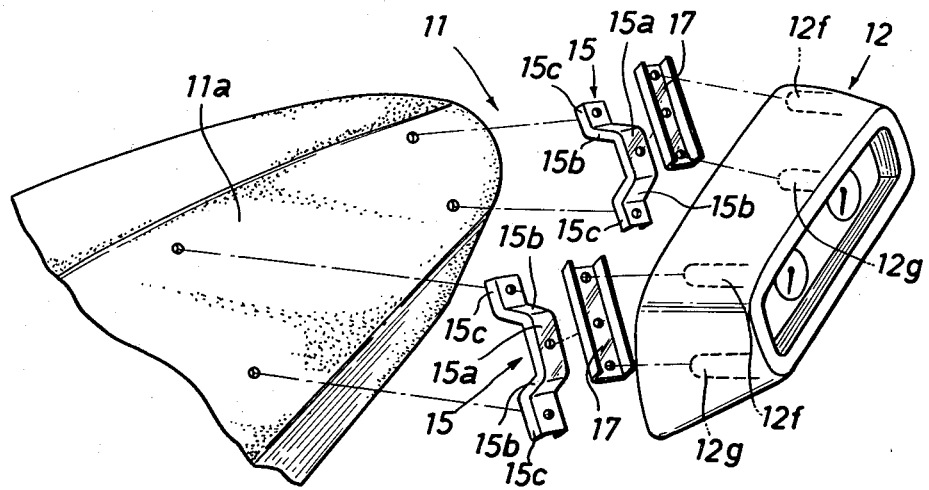
FIG. 4 is a perspective view of a disassembled instrument panel in accordance with a second embodiment of the present invention.
Figure 5:
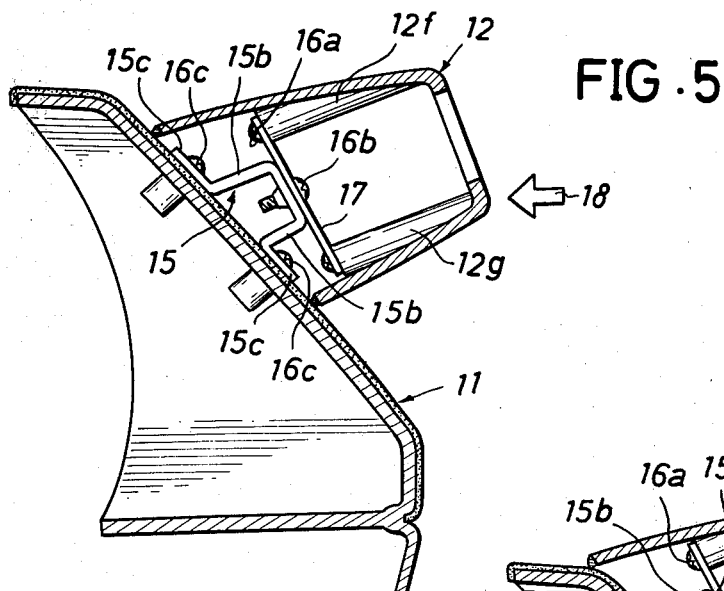
FIG. 5 is a vertical cross-sectional view of the instrument panel of FIG. 4 in assembled condition.
Figure 6:
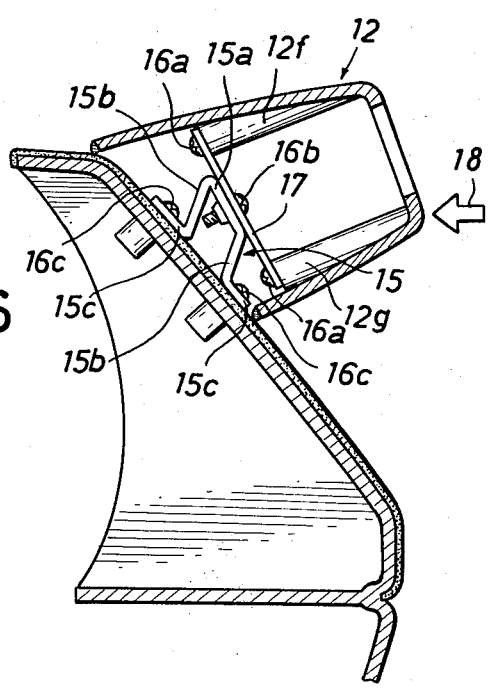
FIG. 6 is a view similar to FIG. 5, showing the manner in which the metal casing yields under an impacting force.

FIGS. 4 through 6 show an instrument panel 11 according to a second embodiment of the present invention. A meter casing or housing 12 has an upper pair of bosses 12f, 12f, and a lower pair of bosses 12g, 12g. As shown in FIG. 5, a pair of first stays 17, 17 each have opposite end portions thereof fastened by respective screws 16a, 16a to the distal ends of one of the upper bosses 12f and a corresponding one of the lower bosses 12g, respectively. A pair of second stays 15, 15 have the central base portions 15a, 15a thereof fastened to the first stays 17, 17, respectively, by screws 16b. The first and second stays 17, 15 each have channel-shaped cross sections opening away from each other when mounted. Each of the second stays 15, 15 includes a pair of leg portions 15b, 15b extending substantially transversely from the central base portion 15a and away from the first stay 17, and a pair of flanges 15c, 15c extending angularly from the leg portions 15b, 15b, respectively, and fastened by screws 16c to a base 11a of the instrument panel 11. When mounted on the panel base 11a, the leg portions 15b, 15b of the second stays 15, 15 are substantially angularly inclined relative to a principal direction indicated by arrow 18 (FIGS. 5 and 6) in which severe impacts against the meter casing 12 are likely to occur.

When the meter casing 12 is subjected to an impact in the direction of arrow 18, the leg portions 15b, 15b of the second stays 15, 15 give way and buckle laterally to permit the meter casing 12 to yield or be displaced upwardly and forwardly as shown in FIG. 6. Displacement or yielding of the meter casing 12 prevents the casing from being broken or damaged and absorbs the impact imposed, and protects a person colliding with the meter casing 12 from serious injury.

With the arrangement of the present invention, the stays 5 or 15 can give way and buckle under impacting forces to permit the meter casing 2 or 12 to yield or be displaced without being broken or damaged, thereby absorbing the impacting forces imposed thereon. Further, the meter casings 2 and 12 and the instrument panel bases 1a, 11a can be designed substantially without regard to the mechanical strength thereof due to the buckling of the stays 5 or 15 under forces of impact.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. An instrument panel for vehicles, comprising:
an instrument panel base mounted on a vehicle body;
a substantially trough-shaped meter casing mounted on said instrument panel base;
at least one stay disposed in said trough-shaped meter casing;
said meter casing being provided with bosses extending inwardly within said trough-shaped meter casing toward said instrument panel base;
said stay including a pair of leg portions substantially angularly inclined relative to a principal direction of impacts against said meter casing;
said meter casing being fastened to said instrument panel base by said at least one stay at fastening portions of said meter casing defined by said bosses; and
said angularly inclined leg portions of said stay being adapted to buckle when said meter casing is subjected to impacting forces.

2. An instrument panel according to claim 1, wherein:
said stay includes a pair of flanges extending from said leg portions and fastened to said bosses; and
said stay further includes a central base portion extending between said leg portions and attached to said instrument panel base.

3. An instrument panel according to claim 1, wherein:
said at least one stay includes a pair of flanges extending from said leg portions and a central base portion extending between said leg portions;
said pair of flanges of said at least one stay are attached to said instrument panel base;
at least one other stay is fastened to said bosses; and
said central base portion of said at least one stay is attached to said at least one other stay fastened to said bosses.

4. An instrument panel according to claim 1, wherein:
said bosses include a pair of bosses extending along an upper wall and a lower wall of said meter casing, respectively, adjacent each sidewall of said meter casing, such that said fastening portions defined by said bosses are provided at four spaced upper and lower inner side positions within said casing; and
a pair of said stays are provided.

5. An instrument panel according to claim 1, wherein:
said angularly inclined leg portions of said stay buckle laterally when said meter case is subjected to impacting forces.

6. An instrument panel according to claim 1, wherein:
said trough-shaped meter casing includes an open rear side facing toward the front of said vehicle body, said open rear side including a peripheral edge defined by the rear edges of spaced upper, lower and side walls of said casing;
said meter casing is mounted on said instrument panel base such that said peripheral edge thereof is in its entirety disposed adjacent said instrument panel base; and
said meter casing yields and is displaced along the surface of said instrument panel base in response to buckling of said angularly inclined leg portions of said stay when said meter case is subjected to impacting forces.

7. An instrument panel according to claim 6, wherein:
said angularly inclined leg portions of said stay buckle laterally when said meter case is subjected to impacting forces; and
said meter casing yields and is displaced in an upward and forward direction of said vehicle body in response to said buckling of said angularly inclined leg portions.

8. An instrument panel according to claim 1 or 7, wherein:
said angularly inclined leg portions of said stay are substantially parallel with each other and are connected so as to be spaced from each other by a central base portion of said stay; and
said stay is fastened between said fastening portions defined by said bosses and said instrument panel base such that each said leg portion is angularly inclined upwardly relative to said principal direction of impacts against said meter casing.

* * * * *